United States Patent
Yee et al.

(10) Patent No.: US 9,147,253 B2
(45) Date of Patent: Sep. 29, 2015

(54) RASTER SCANNING FOR DEPTH DETECTION

(75) Inventors: Dawson Yee, Medina, WA (US); John Lutian, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/527,203

(22) Filed: Jun. 19, 2012

(65) Prior Publication Data

US 2012/0257020 A1 Oct. 11, 2012

Related U.S. Application Data

(63) Continuation of application No. 12/726,250, filed on Mar. 17, 2010, now Pat. No. 8,279,418.

(51) Int. Cl.
*G06T 7/00* (2006.01)
*G01C 3/08* (2006.01)

(52) U.S. Cl.
CPC ............... *G06T 7/0057* (2013.01); *G01C 3/08* (2013.01); *G06T 2207/30196* (2013.01)

(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| | | |
|---|---|---|
| 4,288,078 A | 9/1981 | Lugo |
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |

(Continued)

FOREIGN PATENT DOCUMENTS

| | | |
|---|---|---|
| CN | 1350633 A | 5/2002 |
| CN | 1685741 A | 10/2005 |

(Continued)

OTHER PUBLICATIONS

Griffith Hamlin, Jr. et al., "Raster-Scan Hidden Surface Algorithm Techniques", Siggraph '77, Jul. 20-22, San Jose, California http://delivery.acm.org/10.1145/570000/563895/p206-hamlin.pdf?key1=563895&key2=6403474621&coll=portal&dl=ACM&CFID=25432631&CFTOKEN=65578812.

(Continued)

*Primary Examiner* — Luke Ratcliffe
(74) *Attorney, Agent, or Firm* — Gregg Wisdom; Judy Yee; Micky Minhas

(57) ABSTRACT

Techniques are provided for determining distance to an object in a depth camera's field of view. The techniques may include raster scanning light over the object and detecting reflected light from the object. One or more distances to the object may be determined based on the reflected image. A 3D mapping of the object may be generated. The distance(s) to the object may be determined based on times-of-flight between transmitting the light from a light source in the camera to receiving the reflected image from the object. Raster scanning the light may include raster scanning a pattern into the field of view. Determining the distance(s) to the object may include determining spatial differences between a reflected image of the pattern that is received at the camera and a reference pattern.

19 Claims, 9 Drawing Sheets

(56) References Cited

U.S. PATENT DOCUMENTS

| | | | |
|---|---|---|---|
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,367,378 A * | 11/1994 | Harding et al. ............... 356/613 |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,838,428 A | 11/1998 | Pipitone et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,959,286 A | 9/1999 | Dvorkis et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,768,782 B1 | 7/2004 | Hsieh et al. |
| 6,788,809 B1 | 9/2004 | Grzeszczuk et al. |
| 6,801,637 B2 | 10/2004 | Voronka et al. |
| 6,810,135 B1 | 10/2004 | Berenz et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,186,977 B2 | 3/2007 | Martin et al. |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 * | 8/2007 | Bell ............................ 345/156 |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,518,641 B2 | 4/2009 | Mashitani et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |

(56) References Cited

U.S. PATENT DOCUMENTS

| | | | |
|---|---|---|---|
| 7,634,129 B2 | 12/2009 | Strom | |
| 7,645,971 B2 | 1/2010 | Gouch | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,791,022 B2 | 9/2010 | Nakamura et al. | |
| 7,809,167 B2 | 10/2010 | Bell | |
| 7,834,846 B1 | 11/2010 | Bell | |
| 7,847,229 B2 | 12/2010 | Aoki et al. | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,126,219 B2 | 2/2012 | Fukuda | |
| 8,344,306 B2 | 1/2013 | Kim | |
| 2002/0180987 A1* | 12/2002 | Johnston et al. | 356/601 |
| 2005/0068517 A1 | 3/2005 | Evans et al. | |
| 2005/0094136 A1* | 5/2005 | Xu et al. | 356/237.3 |
| 2005/0103979 A1 | 5/2005 | Heigel | |
| 2006/0116851 A1* | 6/2006 | Utsugi et al. | 702/166 |
| 2008/0026838 A1 | 1/2008 | Dunstan et al. | |
| 2008/0152191 A1 | 6/2008 | Fujimura et al. | |
| 2009/0039235 A1 | 2/2009 | MacFarlane et al. | |
| 2009/0046360 A1 | 2/2009 | Funk | |
| 2009/0141933 A1 | 6/2009 | Wagg | |
| 2009/0221368 A1 | 9/2009 | Yen et al. | |
| 2009/0244078 A1 | 10/2009 | Kanai | |
| 2010/0294928 A1 | 11/2010 | Bunton et al. | |
| 2011/0228251 A1 | 9/2011 | Yee et al. | |

FOREIGN PATENT DOCUMENTS

| | | |
|---|---|---|
| CN | 1777916 A | 5/2006 |
| CN | 101022562 A | 8/2007 |
| CN | 101047792 A | 10/2007 |
| CN | 101088137 A | 12/2007 |
| CN | 101226276 A | 7/2008 |
| CN | 101606216 A | 12/2009 |
| CN | 101635860 A | 1/2010 |
| CN | 101254344 B | 6/2010 |
| EP | 0583061 A2 | 2/1994 |
| EP | 1622081 A1 | 2/2006 |
| GB | 1184304 A | 3/1970 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 00/70303 A1 | 11/2000 |
| WO | WO2009059065 A1 | 5/2009 |

OTHER PUBLICATIONS

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

(56) References Cited

OTHER PUBLICATIONS

English Machine-translation of Japanese Publication No. JP08-044490 published on Feb. 16, 1996.
Office Action dated Dec. 15, 2011, U.S. Appl. No. 12/726,250, filed Mar. 17, 2010, 13 pages.
Response to Office Action dated Mar. 14, 2012, U.S. Appl. No. 12/726,250, filed Mar. 17, 2010, 12 pages.
Notice of Allowance and Fee(s) Due dated May 21, 2012, U.S. Appl. No. 12/726,250, filed Mar. 17, 2010, 32 pages.
Chinese Office Action dated Aug. 22, 2013, Chinese Patent Application No. 201110072053.0, filed Mar. 16, 2011, 11 pages.
Partial English translation of Chinese Office Action dated Aug. 22, 2013, Chinese Patent Application No. 201110072053.0, filed Mar. 16, 2011, 5 pages.
Response to Chinese Office Action dated Sep. 4, 2013, Chinese Patent Application No. 201110072053.0, filed Mar. 16, 2011, 3 pages.
English Translation of claim amendments in Response to Chinese Office Action dated Sep. 4, 2013, Chinese Patent Application No. 201110072053.0, filed Mar. 16, 2011, 2 pages.
Chinese Office Action dated May 17, 2013, Chinese Patent Application No. 201110072053.0, filed Mar. 16, 2011, 10 pages.
Partial English Translation of Chinese Office Action dated May 17, 2013, Chinese Patent Application No. 201110072053.0, filed Mar. 16, 2011, 3 pages.
Response to Chinese Office Action dated May 29, 2013, Chinese Patent Application No. 201110072053.0, filed Mar. 16, 2011, 5 pages.
English Translation of Amended Claims in Response to Chinese Office Action dated May 29, 2013, Chinese Patent Application No. 201110072053.0, filed Mar. 16, 2011, 4 pages.
Chinese Office Action dated Feb. 5, 2013, Chinese Patent Application No. 201110072053.0, filed Mar. 16, 2011, 10 pages.
Partial English Translation of Chinese Office Action dated Feb. 5, 2013, Chinese Patent Application No. 201110072053.0, filed Mar. 16, 2011, 3 pages.
Response to Chinese Office Action dated Mar. 4, 2013, Chinese Patent Application No. 201110072053.0, filed Mar. 16, 2011, 5 pages.
English Translation of Claim Amendments in Response to Chinese Office Action dated Mar. 4, 2013, Chinese Patent Application No. 201110072053.0, filed Mar. 16, 2011, 3 pages.
English Abstract of Foreign Patent Document CN101226276, published Jul. 23, 2008, Applicant Univ Changchun Science & Tech, 1 page.
Chinese Office Action dated Jan. 9, 2014, Chinese Patent Application No. 201110072053.0, filed Mar. 16, 2011, 4 pages.
Partial English language translation of Chinese Office Action dated Jan. 9, 2014, Chinese Patent Application No. 201110072053.0, filed Mar. 16, 2011, 3 pages.
Response to Chinese Office Action dated Jan. 26, 2014, Chinese Patent Application No. 201110072053.0, filed Mar. 16, 2011, 6 pages.
Partial English language translation of Response to Chinese Office Action dated Jan. 26, 2014, Chinese Patent Application No. 201110072053.0, filed Mar. 16, 2011, 6 pages.

* cited by examiner

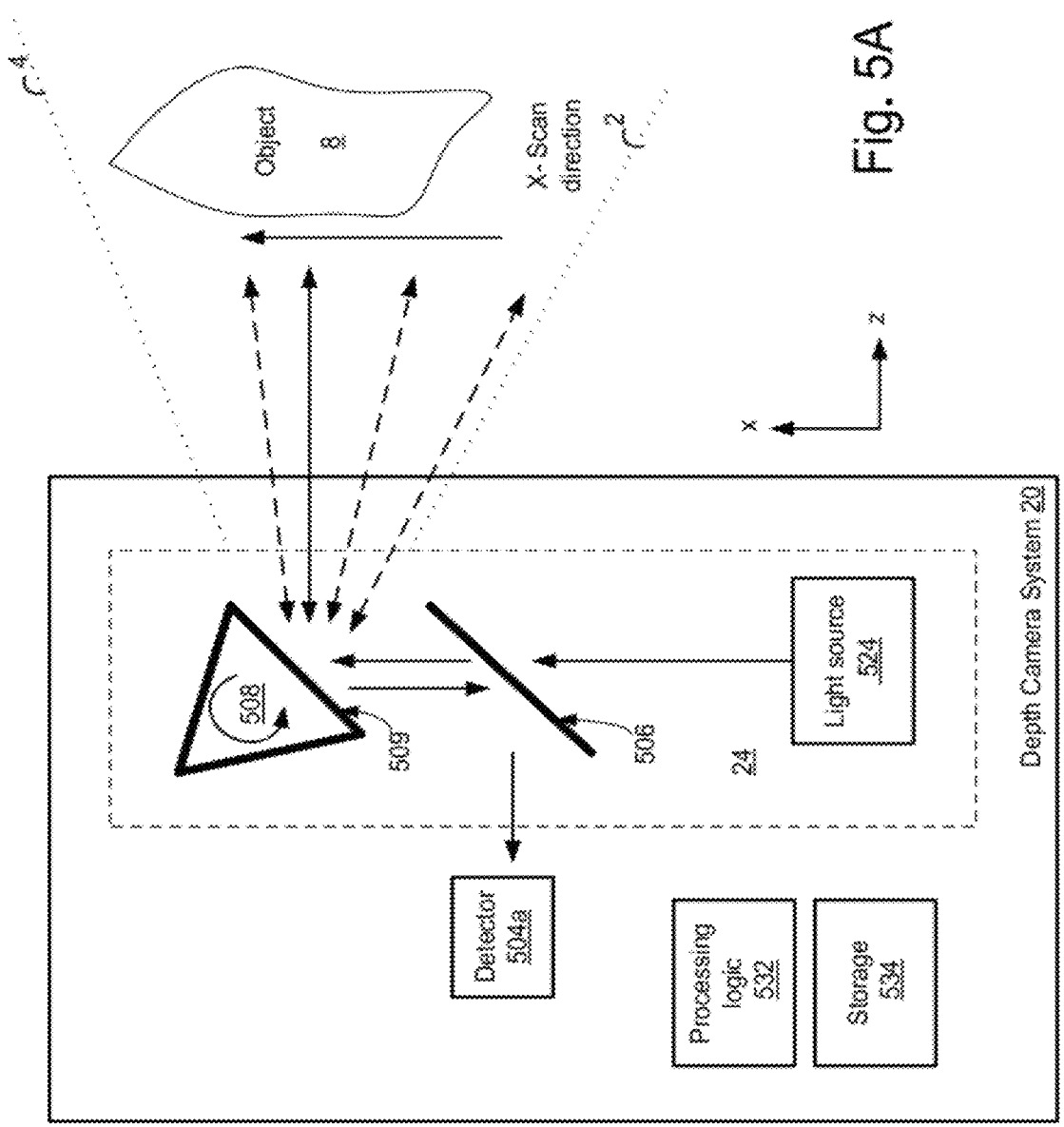

US 9,147,253 B2

RASTER SCANNING FOR DEPTH DETECTION

CLAIM OF PRIORITY

This application is a continuation application of U.S. patent application Ser. No. 12/726,250, entitled "RASTER SCANNING FOR DEPTH DETECTION," filed Mar. 17, 2010, now U.S. Pat. No. 8,279,418, which is incorporated herein by reference in its entirety.

BACKGROUND

A depth camera system obtains data regarding the location of a human or other object in a physical space. This information may be referred to as "depth information." The depth information may be input to an application in a computing system for a wide variety of applications. Many applications are possible, such as for military, entertainment, sports and medical purposes. For instance, depth information regarding a human can be mapped to a three-dimensional (3-D) human skeletal model and used to create an animated character or avatar.

To determine depth information, a depth camera may project light onto an object in the camera's field of view. The light reflects off the object and back to the camera, where it is processed to determine the depth information. However, the intensity of the light that is reflected back to the camera may be very weak. Therefore, the signal-to-noise ratio (S/N) may be poor. Furthermore, if part of the object extends out of the camera's field of view, then the depth of that portion of the object cannot be determined.

Therefore, further refinements are needed which allow a more accurate determination of the depth of objects within a field of view of a depth camera. One such need is to improve the S/N of the light signal that reflects from the object. Another need is to provide better control the field of view.

SUMMARY

A machine-implemented method and system are provided for determining depth information for one or more objects within a field of view of a depth camera. The method and system provide for an accurate determination of the depth of objects within a field of view of a depth camera. The method and system may provide for a good S/N of the light signal that reflects from the object. The method and system may allow the depth camera's field of view to be dynamically adjusted.

One embodiment is a machine-implemented method of determining distance to an object. The method includes transmitting light from a light source in a camera. The light is raster scanned over an object in a field of view of the camera. A reflected image of the light is received from the object at a detector. One or more distances to the object are determined based on the reflected image.

One embodiment is a depth camera that includes a light source that transmits light, a scanning element in optical communication with the light source, a light detector, and distance determination logic. The scanning element raster scans the light over a field of view by scanning in an x-direction and a y-direction. The light detector receives a reflected image of the scanned light from an object within the field of view. The distance determination logic determines a distance or distances to the object within the field of view based on the reflected image.

One embodiment is a machine-implemented method of raster scanning a pattern to determine depth information. The method includes transmitting light from a light source in a camera. A scanning element is controlled while transmitting the light to scan a line in a field of view of the camera. An image from an object in the field of view is received at a linear array detector in the camera. The image corresponds to at least a portion of the scan line. A determination is made whether to scan another line in the pattern. The transmitting, controlling, and receiving is repeated if another line is to be scanned. Spatial properties of the received images are analyzed. A distance or distances to the object within the field of view is determined based on the spatial analysis.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIG. 5A depicts a block diagram of one embodiment of a depth camera that may use time-of-flight to determine depth information of a raster scanned light.

DETAILED DESCRIPTION

Techniques are provided for determining one or more distances to an object (or objects) in a depth camera's field of view. The techniques may include raster scanning light over an object in a field of view of the camera. An image of the light that reflects from the object is received at the camera. One or more distances to the object are determined based on the reflected image. In one embodiment, a 3D mapping of one or more objects in the field of view is generated.

In one embodiment, determining the distance(s) to the object includes determining times-of-flight between transmitting the light from a light source in the camera to receiving the reflected image from the object. Separate time-of-flight information may be determined for different points in the raster scan. Therefore, a 3D mapping of the object could be determined.

In one embodiment, raster scanning the light includes raster scanning a pattern into the field of view. Determining the distance(s) to the object may include determining spatial differences between a reflected image of the pattern that is received at the camera and a reference pattern. The pattern that is scanned into the field of view may be a known pattern such as a grid or any other known pattern. The reference pattern may be an image that would result by raster scanning the pattern over a reference object at a known distance from the depth camera.

Figure 1:
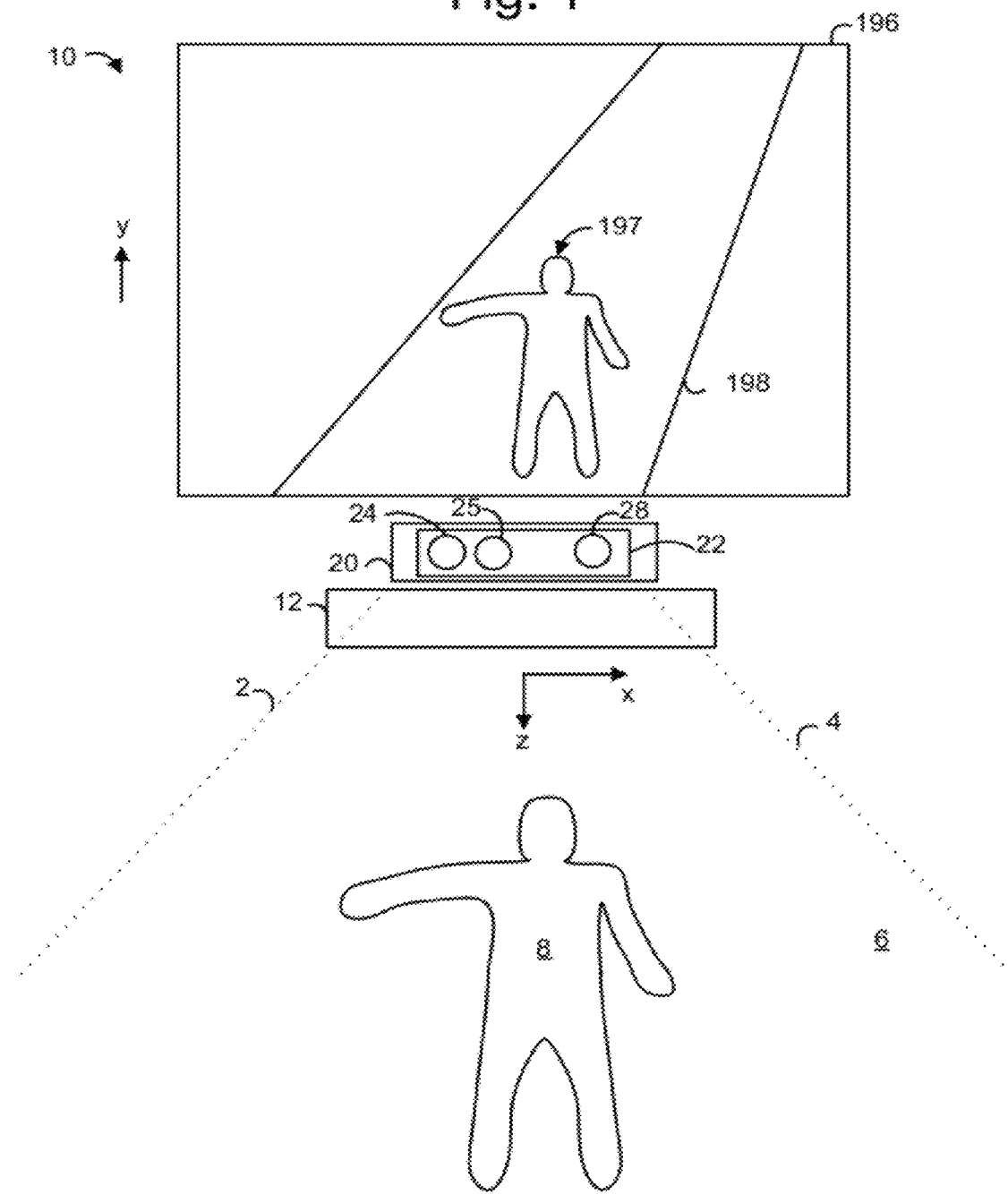
FIG. 1 depicts an example embodiment of a motion capture system.

One possible use of collecting depth information of one or more objects within a field of view of a depth camera is to input the depth information to a motion capture system. However, it will be understood that the depth information is not limited to a motion capture system. For purposes of illustration, an example motion capture system 10 will be described. FIG. 1 depicts an example embodiment of a motion capture system 10 in which a person interacts with an application. The motion capture system 10 includes a display 196, a depth camera system 20, and a computing environment or apparatus 12. The depth camera system 20 may include an image camera component 22 having a depth detection light transmitter 24, depth detection light receiver 25, and a red-green-blue (RGB) camera 28. In one embodiment, the depth detection light transmitter 24 emits a collimated light beam. An example of collimated light includes, but is not limited to, Infrared (IR) laser. In one embodiment, the depth detection light component is an LED. Light that reflects off from an object 8 in the field of view is detected by the depth detection light receiver 25.

A user, also referred to as a person or player, stands in a field of view 6 of the depth camera system 20. Lines 2 and 4 denote a boundary of the field of view 6. In this example, the depth camera system 20, and computing environment 12 provide an application in which an avatar 197 on the display 196 track the movements of the object 8 (e.g., a user) For example, the avatar 197 may raise an arm when the user raises an arm. The avatar 197 is standing on a road 198 in a 3-D virtual world. A Cartesian world coordinate system may be defined which includes a z-axis which extends along the focal length of the depth camera system 20, e.g., horizontally, a y-axis which extends vertically, and an x-axis which extends laterally and horizontally. Note that the perspective of the drawing is modified as a simplification, as the display 196 extends vertically in the y-axis direction and the z-axis extends out from the depth camera system 20, perpendicular to the y-axis and the x-axis, and parallel to a ground surface on which the user stands.

Generally, the motion capture system 10 is used to recognize, analyze, and/or track an object. The computing environment 12 can include a computer, a gaming system or console, or the like, as well as hardware components and/or software components to execute applications.

The depth camera system 20 may include a camera which is used to visually monitor one or more objects 8, such as the user, such that gestures and/or movements performed by the user may be captured, analyzed, and tracked to perform one or more controls or actions within an application, such as animating an avatar or on-screen character or selecting a menu item in a user interface (UI).

The motion capture system 10 may be connected to an audiovisual device such as the display 196, e.g., a television, a monitor, a high-definition television (HDTV), or the like, or even a projection on a wall or other surface, that provides a visual and audio output to the user. An audio output can also be provided via a separate device. To drive the display, the computing environment 12 may include a video adapter such as a graphics card and/or an audio adapter such as a sound card that provides audiovisual signals associated with an application. The display 196 may be connected to the computing environment 12 via, for example, an S-Video cable, a coaxial cable, an HDMI cable, a DVI cable, a VGA cable, or the like.

The object 8 may be tracked using the depth camera system 20 such that the gestures and/or movements of the user are captured and used to animate an avatar or on-screen character and/or interpreted as input controls to the application being executed by computer environment 12.

Some movements of the object 8 may be interpreted as controls that may correspond to actions other than controlling an avatar. For example, in one embodiment, the player may use movements to end, pause, or save a game, select a level, view high scores, communicate with a friend, and so forth. The player may use movements to select the game or other application from a main user interface, or to otherwise navigate a menu of options. Thus, a full range of motion of the object 8 may be available, used, and analyzed in any suitable manner to interact with an application.

The person can hold an object such as a prop when interacting with an application. In such embodiments, the movement of the person and the object may be used to control an application. For example, the motion of a player holding a racket may be tracked and used for controlling an on-screen racket in an application which simulates a tennis game. In another example embodiment, the motion of a player holding a toy weapon such as a plastic sword may be tracked and used for controlling a corresponding weapon in the virtual world of an application which provides a pirate ship.

The motion capture system 10 may further be used to interpret target movements as operating system and/or application controls that are outside the realm of games and other applications which are meant for entertainment and leisure. For example, virtually any controllable aspect of an operating system and/or application may be controlled by movements of the object 8.

Figure 2:
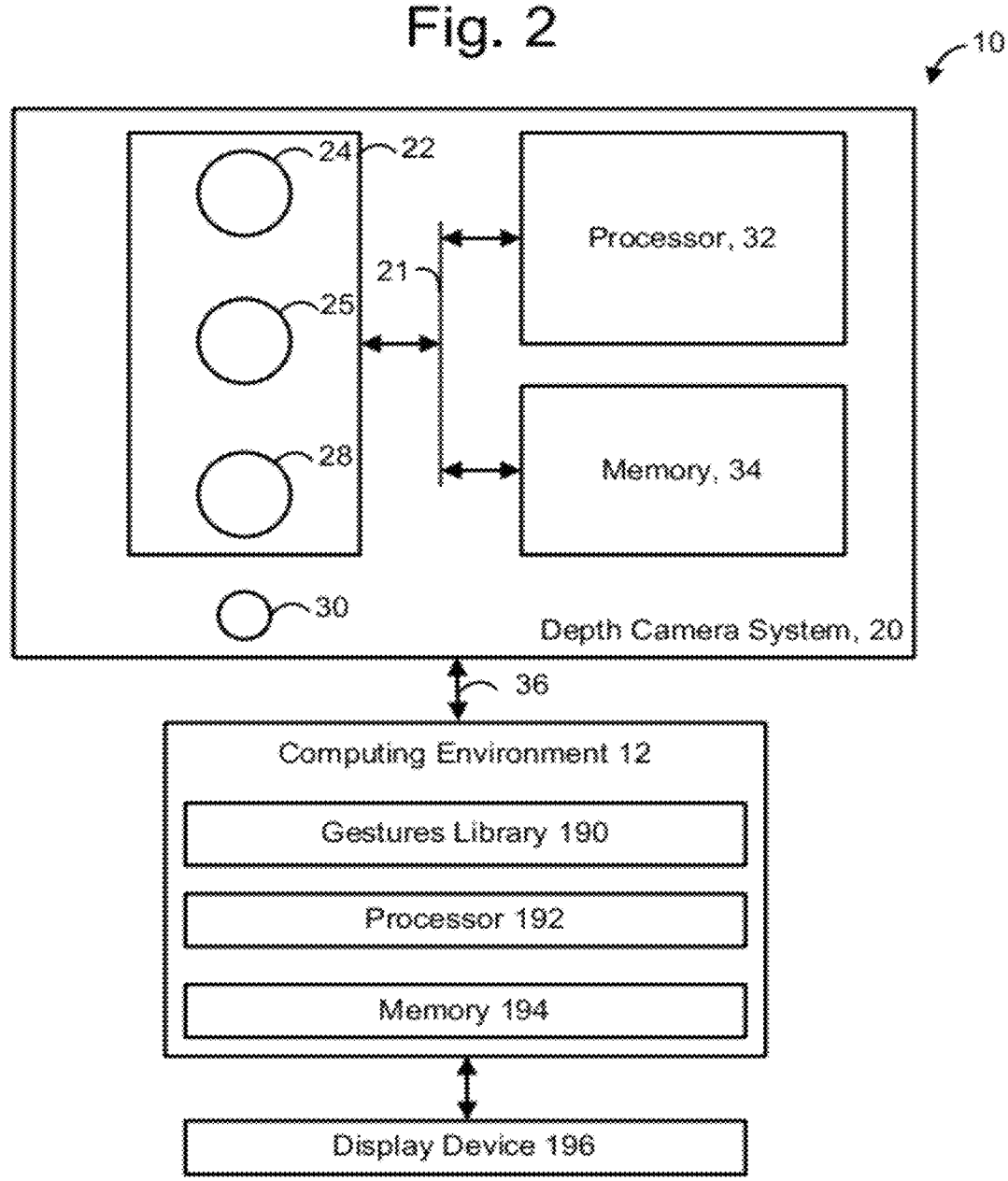
FIG. 2 depicts an example block diagram of the motion capture system of FIG. 1.

FIG. 2 depicts an example block diagram of the motion capture system 10 of FIG. 1a. The depth camera system 20 may be configured to capture video with depth information including a depth image that may include depth values. Technique for determining depth values by illuminating an object using raster scanning are described herein. The depth camera system 20 may organize the depth information into "Z layers," or layers that may be perpendicular to a Z-axis extending from the depth camera system 20 along its line of sight.

The depth camera system 20 may include an image camera component 22, such as a depth camera that captures the depth image of a scene in a physical space. The image camera component 22 may include a depth detection light transmitter 24 and a depth detection light receiver 25 to capture depth information. For example, depth camera system 20 may use the depth detection light transmitter 24 to emit light onto the physical space and use depth detection light receiver 25 to detect the reflected light from the surface of one or more objects in the physical space.

In some embodiments, the depth detection light transmitter 24 transmits pulsed infrared light such that the time between an outgoing light pulse and a corresponding incoming light pulse may be measured and used to determine a physical distance from the depth camera system 20 to a particular location on the objects in the physical space. The phase of the outgoing light wave may be compared to the phase of the incoming light wave to determine a phase shift. Note that the transmitted light may be modulated to assist in determining the phase difference. The phase shift of the modulated light may then be used to determine a physical distance from the depth camera system 20 to a particular location on the targets or objects.

In another example embodiment, the depth camera system 20 may use structured light to capture depth information. In such an analysis, patterned light (e.g., a known pattern such as grid pattern or a stripe pattern) may be projected onto the scene via, for example, the depth detection light transmitter 24. The pattern that is received at the depth detection light receiver 25 may be analyzed to determine depth information. In one embodiment, the pattern is spatially analyzed. In one embodiment, the pattern is analyzed for apparent deformations. That is, the received pattern may appear deformed, as compared to a reference pattern, based on the distance of the object from the camera.

The red-green-blue (RGB) camera 28 may be used to capture an image. The depth information may be merged with the image from the RGB camera 28 in order to create a depth image.

The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet.

The depth camera system 20 may include a processor 32 that is in communication with the image camera component 22. The processor 32 may include a standardized processor, a specialized processor, a microprocessor, or the like that may execute instructions including, for example, instructions for determining a depth image, which will be described in more detail below.

The depth camera system 20 may further include a memory component 34 that may store instructions that are executed by the processor 32, as well as storing images or frames of images captured by the RGB camera, or any other suitable information, images, or the like. According to an example embodiment, the memory component 34 may include random access memory (RAM), read only memory (ROM), cache, Flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by the RGB camera 28 to the computing environment 12 via the communication link 36. The computing environment 12 may then use the depth information, and captured images to control an application. For example, as shown in FIG. 2, the computing environment 12 may include a gestures library 190, such as a collection of gesture filters, each having information concerning a gesture that may be performed (as the user moves). For example, a gesture filter can be provided for various hand gestures, such as swiping or flinging of the hands. By comparing a detected motion to each filter, a specified gesture or movement which is performed by a person can be identified. An extent to which the movement is performed can also be determined.

The computing environment may also include a processor 192 for executing instructions which are stored in a memory 194 to provide audio-video output signals to the display device 196 and to achieve other functionality as described herein.

Figure 3:
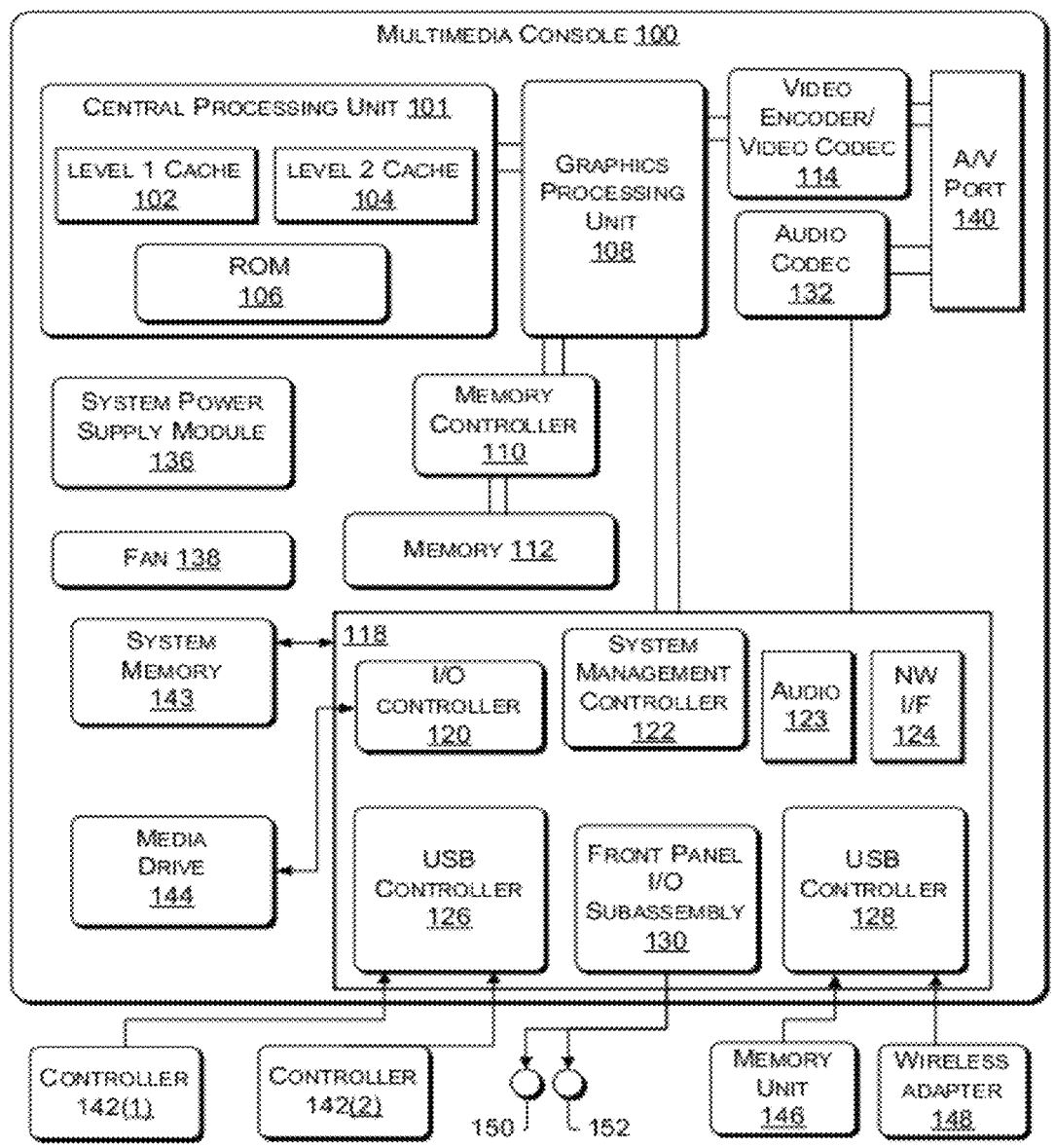
FIG. 3 depicts an example block diagram of a computing environment that may be used in the motion capture system of FIG. 1.

FIG. 3 depicts an example block diagram of a computing environment that may be used in the motion capture system of FIG. 1. The computing environment can be used to determine distances to objects in the field of view of a depth camera based on depth information. The computing environment such as the computing environment 12 described above may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that may be implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation may be large enough to contain the launch kernel, concurrent system applications and drivers. The CPU reservation is may be constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory for an overlay may depend on the overlay area size and the overlay may scale with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications may be scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager may control the switching of input stream, without knowledge the gaming application's knowledge and a driver maintains state information regarding focus switches. The console 100 may receive additional inputs from the depth camera system 20 of FIG. 2, including the camera 28.

Figure 4:
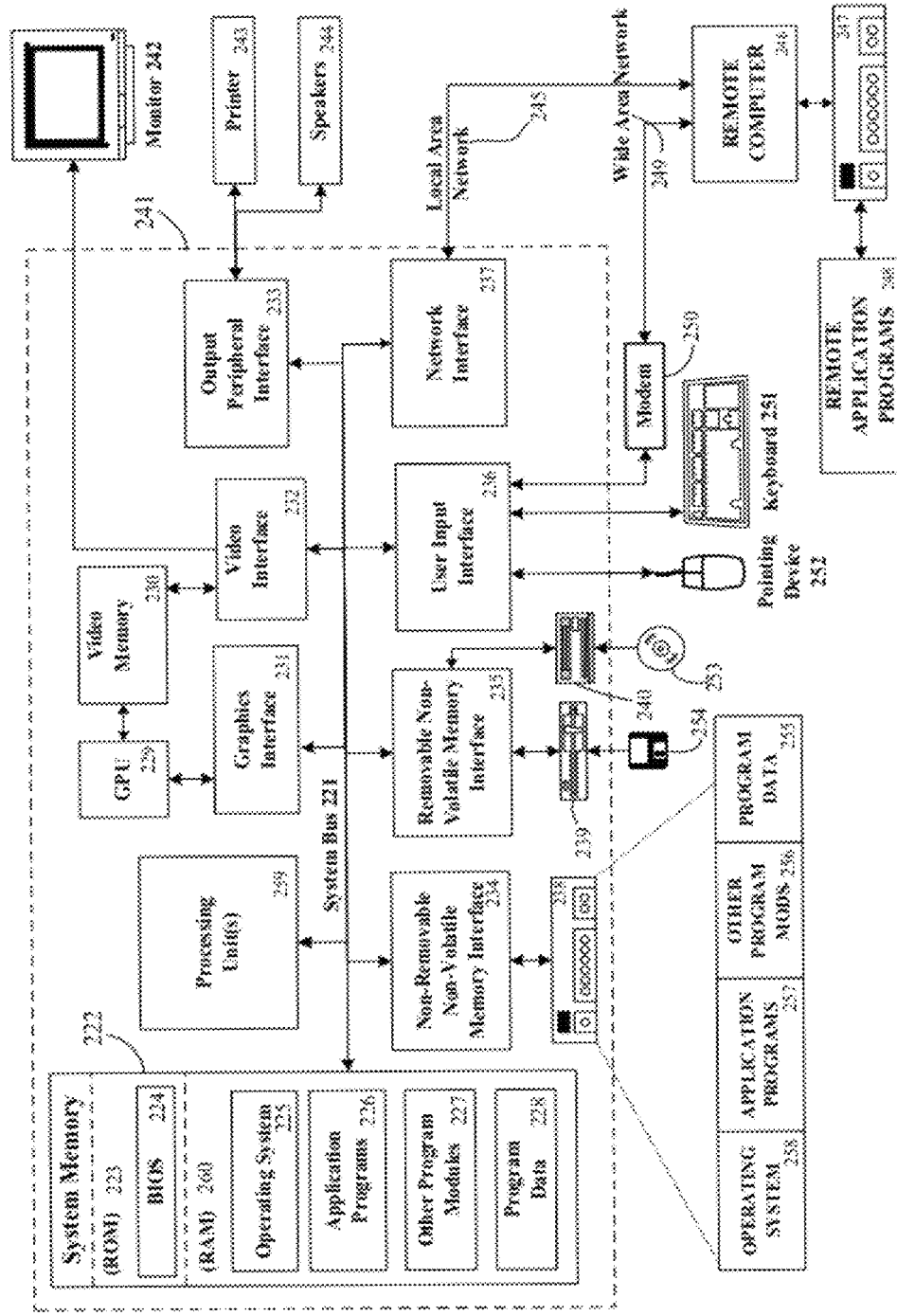
FIG. 4 depicts another example block diagram of a computing environment that may be used in the motion capture system of FIG. 1.

FIG. 4 depicts another example block diagram of a computing environment that may be used in the motion capture system of FIG. 1. The computing environment can be used to determine distances to objects in the field of view of a depth camera based on depth information. The computing environment 220 comprises a computer 241, which typically includes a variety of tangible computer readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229. By way of example, and not limitation, FIG. 4 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and depicted in FIG. 4, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The depth camera system 20 of FIG. 2, including camera 28, may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 4. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 depicts remote application programs 248 as residing on memory device 247. It will be appreciated that the network connections shown are exemplary and other means of establishing a communications link between the computers may be used.

FIG. 5A depicts a block diagram of one embodiment of a depth camera system 20. In one embodiment, the depth camera system 20 of FIG. 5A determines distance based on time-of-flight of raster scanned light. The depth camera system 20 may be used in the example motion capture system 10 of FIG. 1; however, it may be used in other systems. The depth camera system 20 has a light source 524, a beam splitter 506, a rotating scanning element 508, a detector 504a, processing logic 532 and storage 534. Together, the light source 524, the beam splitter 506, and the scanning element 508 form the depth detection light transmitter 24. The detector 504a is one embodiment of a depth detection light receiver 25 of the device of FIG. 2.

In one embodiment, the light source 524 emits a collimated light beam. The light source 524 may emit Infrared laser, among other light beams. In one embodiment, the light source 524 emits a sequence of pulses of light. The sequence may be encoded or modulated in way that assists determining time-of-flight. For example, time-of-flight may be determined based on a phase difference between the transmitted modulated light and received light. In one embodiment, the light source 524 is a point source. The light is transmitted through the beam splitter 506 onto the scanning element 508. Note that the beam splitter 506 is an optional component that may help to reduce the number of components.

In one embodiment, the scanning element 508 has one or more surfaces 509 that reflect light. In one embodiment, the scanning element 508 rotates under control of processing logic 532. In one embodiment, the scanning element 508 rotates such that the light from light source 524 scans over the field of view in the x-direction and the y-direction. Note that the scanning element 508 may include more than one rotating element. For example, one element may rotate as depicted in FIG. 5A to scan in the x-direction, and a second element may rotate into and out of the page of FIG. 5A. Techniques for two-dimensional raster scanning are well-known to those of ordinary skill in the art. The x-component of the field of view is depicted by lines 2, 4. Note that there is also a y-component to the field of view (not depicted in FIG. 5A).

A circular arrow is depicted on the scanning element 508 to show an example direction of rotation. The direction may be clockwise instead. The solid arrows depict the light path that corresponds to the depicted position of the scanning element 508. The dashed arrows correspond to light paths that correspond to positions of the scanning element 508 when it has rotated to other angles. Thus, the dashed arrows correspond to a different point in time. Note that although the scanning element 508 is depicted as a rotating element with multiple surfaces other types of scanning elements may be used.

In one embodiment, the scanning element 508 is capable of scanning multiple lines in the x-direction, each with a different y-position. After scanning one line in the x-direction, the scanning element 508 is controlled in a way that scans a second line at a new y-position. For example, the scanning element 508 may be rotated in a direction that is in-and-out of the page of FIG. 5B. Note that the lines are not necessarily continuous. Many different scan paths can be used. Further details are discussed below.

Light that reflects off from the one or more objects 8 in the field of view is captured by the detector 504a. In this example, the light reflects off from the object 8 and back to the scanning element 508 (as depicted by the double arrows). The light then travels back to the beam splitter 506 and then to the detector 504a. As previously mentioned, the beam splitter 506 is not a requirement. The detector 504a may be for example, a CMOS detector, photodiode detector, or a Charge Coupled Device (CCD). In one embodiment, the data the detector 504a collects is analyzed as a single data point. As the raster scanning proceeds to illuminate a new portion of the object 8, additional data may be collected by the detector 504a.

In the embodiment depicted in FIG. 5A, the axis of illumination is aligned with the image axis. This is depicted by the double-headed arrows between the scanning element 508 and the object. The axis of illumination is indicated by the arrowhead near the object 8. The image axis is indicated by the arrowhead near the scanning element 508. In other embodiments, the axis of illumination is not aligned with the image axis.

The processing logic 532 is able to determine distance to the object 8 based on the image captured by the detector 504*a*. In one embodiment, the distance to the object 8 is determined based on the time-of-flight between transmitting the light from the source 524 to receiving the reflected image at the detector 504*a*. Note that since the light from the source 524 is being scanned across the field of view that the detector 504*a* will collect numerous separate data points that correspond to different x- and y-positions in the field of view.

In one embodiment, the processing logic 532 is a processor that executes instructions that are stored in memory such as storage 534. However, the processing logic 532 can be implemented in whole or in part with hardware. In one embodiment, the processing logic 532 includes an Application Specific Integrated Circuit (ASIC). Note that the storage 534 could be addressable memory such as RAM, ROM, registers, etc. However, the storage 534 could also includes non-addressable storage. For example, the storage 534 may include latches that are not necessarily addressable by a processor.

Figure 5B:
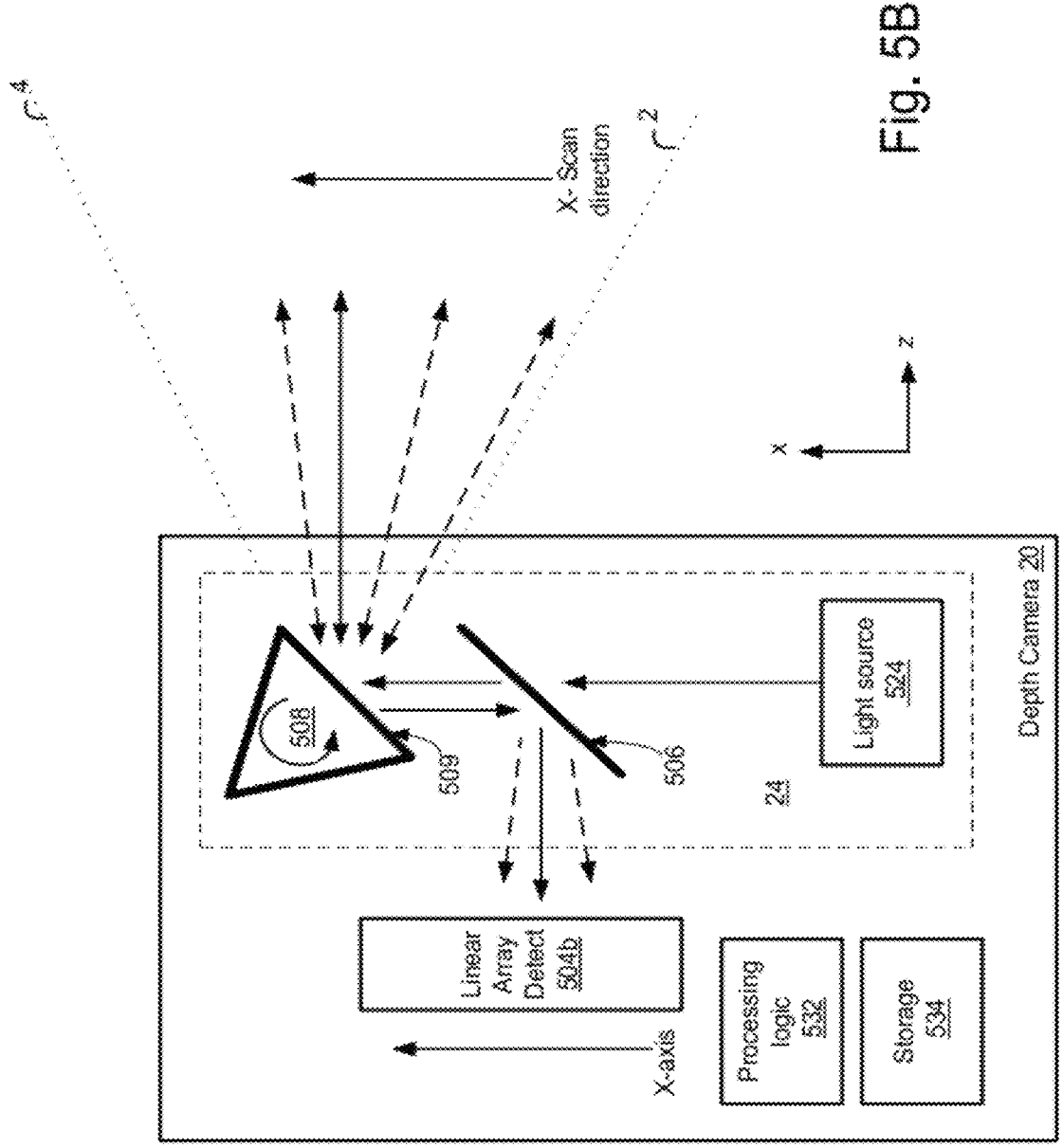
FIG. 5B depicts a block diagram of one embodiment of a depth camera that uses a structured light pattern to determine depth information.

FIG. 5B depicts a block diagram of one embodiment of a depth camera 20 that may use a light pattern to determine depth information. This embodiment is different from FIG. 5A in that it has a linear array detector 504*b* instead of detector 504*a*. Thus, the linear array detector 504*b* is one embodiment of the depth detection light receiver 25 of the device of FIG. 2. As with the embodiment of FIG. 5A, raster scanning is used to illuminate an object 8 in the field of view. However, in this case, a pattern is raster scanned into the field of view. The pattern may be spatially analyzed to determine depth information. For example, depth information may be determined based on deformation or warping in the reflected pattern. Note that this may be an apparent deformation based on the vantage point of the linear array detector 504*b*.

The depth camera 20 may be used in the example motion capture system 10 of FIG. 1; however, it may be used in other systems. The depth camera 20 has a light source 524, a beam splitter 506, a rotating scanning element 508, linear array detector 504*b*, processing logic 532, and storage. Together, the light source 524, the beam splitter 506, and the scanning element 508 form the depth detection light transmitter 24. The linear array detector 504*b* is one embodiment of a depth detection light receiver 25.

In one embodiment, the light source 524 emits a collimated light beam. The light source 524 may emit Infrared laser, among other light beams. In one embodiment, the light source 524 emits a sequence of pulses of light. In one embodiment, the light source 524 is a point source. The light is transmitted through the beam splitter 506 onto the scanning element 508.

The scanning element 508 may be similar to the one in FIG. 5A and will not be discussed in detail. In this embodiment, the scanning element 508 is used to project a pattern into the field of view. Therefore, the pattern may be projected onto whatever objects 8 may be in the field of view. In one embodiment, the pattern is a known pattern, such as grid pattern or a stripe pattern. Note that because the pattern is being raster scanned across the field of view, only one point of the pattern is being projected at any one time. This allows for a very high S/N as all of the energy may be concentrated on a small point. Stated another way, only a portion of the pattern is being projected at any one time.

Light that reflects off from the one or more objects 8 in the field of view is captured by the linear array detector 504*b*. In this example, the light reflects off from the object 8 and back to the scanning element 508 (as depicted by the double arrows). The light then travels back to the beam splitter 506 and then to the detector 504*b*. Note that the linear array detector 504*b* may collect many data points. For example, the linear array detector 504*b* may collect many points for a scan line. After the scanning element 508 is moved to scan a new line at a different y-position, the linear array detector 504*b* may be used to collect a new set of data points. The linear array detector 504*b* may be for example, a CMOS detector, photodiode detector, or a CCD. In one embodiment, the linear array detector 504*b* is able to detect light over a linear region.

Therefore, the linear array detector 504*b* collects a reflected image that is due to the pattern projected onto the object. The distance the object 8 is from the camera may have an impact on the received pattern. For example, one could consider projecting the pattern onto a reference object 8 at a known distance from the camera. If that same pattern is projected onto an object 8 at a different distance from the camera, the pattern may appear to be "warped" or "deformed." In one embodiment, the parallax affect is taken advantage of to cause the pattern to appear to deform from the vantage point of the linear array detector 504*b*. The nature and amount of the deformation may be analyzed to determine the distance to the object. In one embodiment, a z-direction mapping of the object 8 may be made. That is, for each x- and y-position scan points, a z-position may be determined. Thus, the processing logic 532 is able to determine distance to the object 8 based on the image captured by the linear array detector 504*b*.

In the embodiment depicted in FIG. 5B, the axis of illumination is aligned with the image axis. This is depicted by the double-headed arrows between the scanning element 508 and the object. The axis of illumination is indicated by the arrowhead near the object. The image axis is indicated by the arrowhead near the scanning element 508. In other embodiments that use a linear array detector 504*b*, the axis of illumination is not aligned with the image axis.

Figure 6:
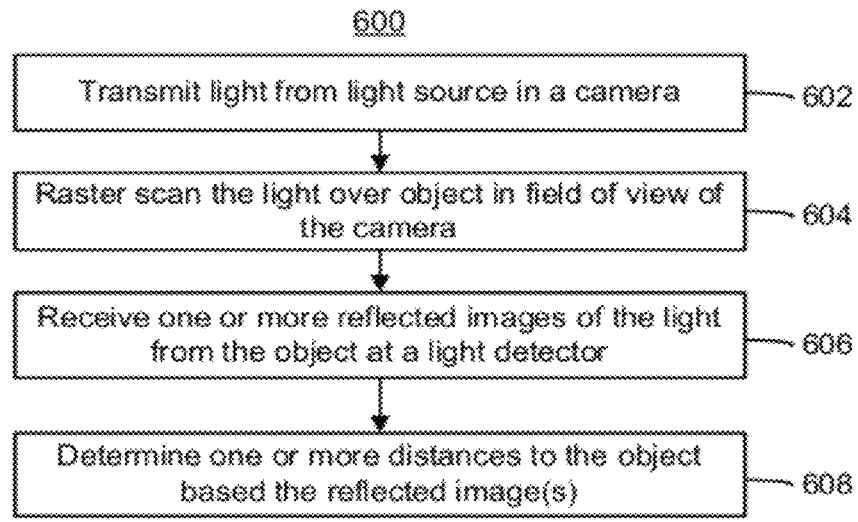
FIG. 6 is a flowchart of one embodiment of a process of determining a distance to one or more objects in the field of view of a depth camera.

FIG. 6 is a flowchart of one embodiment of a process 600 of determining a distance to one or more objects 8 in the field of view of a depth camera. The process 600 may used in the depth camera of any of FIG. 5A or 5B. However, process 600 is not limited to those embodiments.

In step 602, light is transmitted from a light source 524 in a depth camera 20. For example, the light source 524 in any of the depth cameras 20 of FIGS. 5A-5B transmits light. The light may be collimated. In one embodiment, the light is Infrared. In one embodiment, the light is a laser beam. On one embodiment, the light source 524 emits pulses of light. In one embodiment, the pulses are structured such that a known pattern can be raster scanned over the camera's field of view.

In step 604, the light is raster scanned over an object 8 in the field of view of the camera. In one embodiment, light from light source 524 is reflected off the scanning element 508 to cause a known pattern to be raster scanned in the camera's field of view. The pattern can be any known pattern. In some embodiments, the pattern is irregular such that different portions of the pattern have unique sub-patterns. In other words, different portions of the pattern may be unique from each other. Note that by raster scanning the pattern that the entire pattern is not transmitted at the same time.

In step 606, a reflected image of the light is received at a light detector 504. The light detector 504 could be a point detector 504*a* or a linear array detector 504*b*. Note that the light is received over a period of time. For example, as the scanning element 508 raster scans the light over the field of view, the detector 504 detects successive portions of the light over time.

In step 608, one or more distances to the object 8 are determined based on the reflected image. In one embodiment, the one or more distances are determined based on time-of-flight information. In one embodiment, the one or more distances are determined based on spatial analysis of the received image or images. In one embodiment, the one or more distances are determined based on apparent deformation of in the received pattern.

Figure 7:
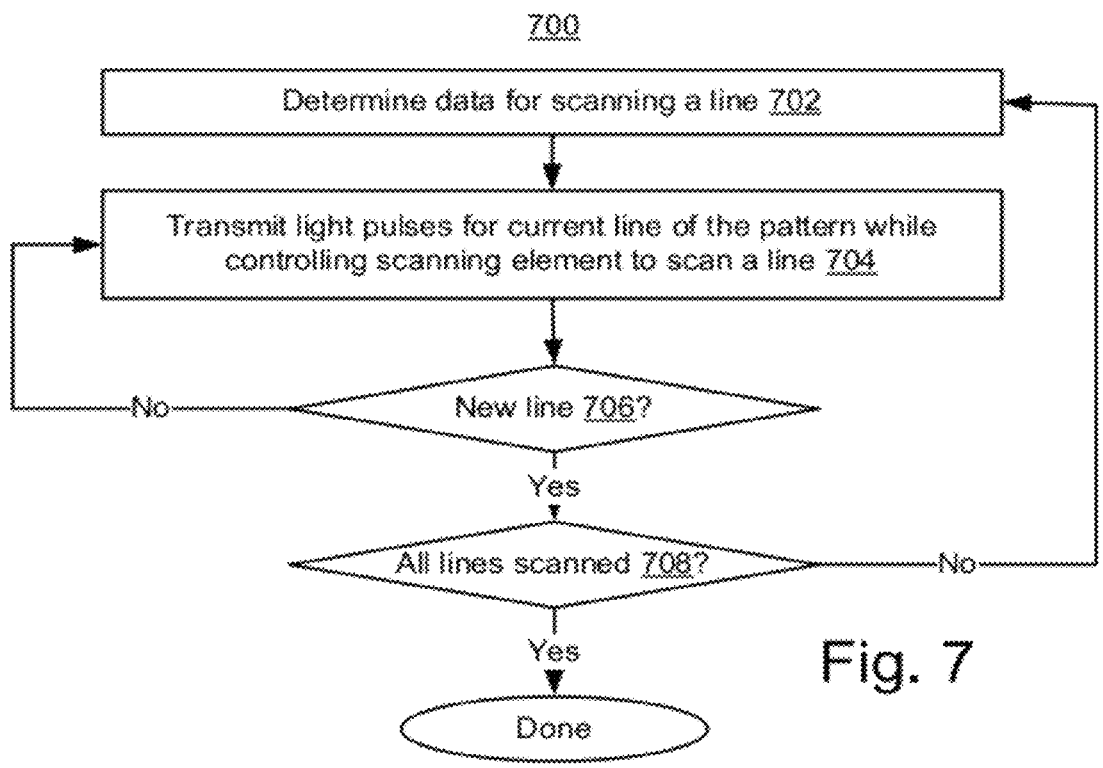
FIG. 7 is a flowchart of one embodiment of a process of scanning a pattern in a depth camera's field of view.

FIG. 7 is a flowchart of one embodiment of a process 700 of scanning a known pattern into a depth camera's field of view. The known pattern can be essentially any pattern such that the received image can be analyzed for apparent deformations in the pattern to determine distance. Process 700 is one embodiment of steps 602-604. Note that, in operation, process 700 may be repeated over and over to scan the pattern again (or to scan a different pattern). Scanning a known pattern may be used in embodiments in which depth is determined based on apparent deformation of the reflected image of the pattern. However, note that embodiments that determine depth based on time-of-flight may also scan a known pattern.

In step 702, data for scanning a line of the pattern is determined. The data may include a sequence of pulses for the light source 524 and how to control the scanning element 508 to scan a line. In one embodiment, the storage 534 stores the data such that step 702 is performed by accessing an appropriate memory address.

In step 704, light for one line of the pattern is transmitted from the light source 524 while the scanning element 508 is controlled to scan the line into the field of view. Note scanning a line does not require that a continuous path is illuminated. Rather, the scan line may have portions that are illuminated separated by portions that are not illuminated. The light source 524 may be pulsed to generate such a scan line. However, the scan line may be a continuous path. In one embodiment, the scan line is approximately horizontal in the field of view. Note that the scan line could be slightly diagonal such that the y-position changes slightly across the scan line. However, note that the scan line may be in any orientation. For example, the scan line could be diagonal such that it goes from upper left to lower right in the field of view. The scan line could be more or less vertical, if desired. Also, the scan line is not required to be a straight line. Thus, in some embodiments, the scan line is curved.

Step 706 is a determination of whether a new line is to be scanned. In one embodiment, the scan line is a predetermined length. For example, a scan line may correspond to a pre-determined angle of rotation of the scanning element 508. Note that this may result in a pre-determined field of view. Also, a scan line may correspond to a pre-determined number of light pulses. However, neither the angle of rotation nor the number of light pulses needs to be pre-determined. In one embodiment, the length of the line being scanned is dynamically adaptable. Therefore, the field of view is dynamically adaptable by varying a range over which raster scanning is performed. For example, there might be a default field of view that can be expanded or narrowed. As one particular example, the field of view can be dynamically narrowed if it is determined that the object 8 of interest has already been scanned. As another particular example, the field of view can be dynamically expanded if it is determined that the object 8 of interest has not yet been fully scanned. For example, of the object 8 of interest is a user's hand, the field of view can be altered to more efficiently capture depth information regarding the hand.

Once it is determined that a new line is to be scanned, data for the next line are determined (step 702). Again, the storage 534 may be accessed to determine the next set of data. Process 700 continues by scanning more lines until it is determined in step 708 that all lines have been scanned. The number of scan lines may be pre-determined or dynamically adjustable. Note that dynamically adjusting the number of lines allows the field of view to be dynamically adjusted. A factor for determining whether more lines are to be scanned may include whether an object 8 of interest has been fully scanned.

Note that one variation of process 700 is to scan lines without scanning any particular pattern. For example, embodiments that determine depth based on time-of-flight do not require any particular pattern to be scanned.

Figure 8A:
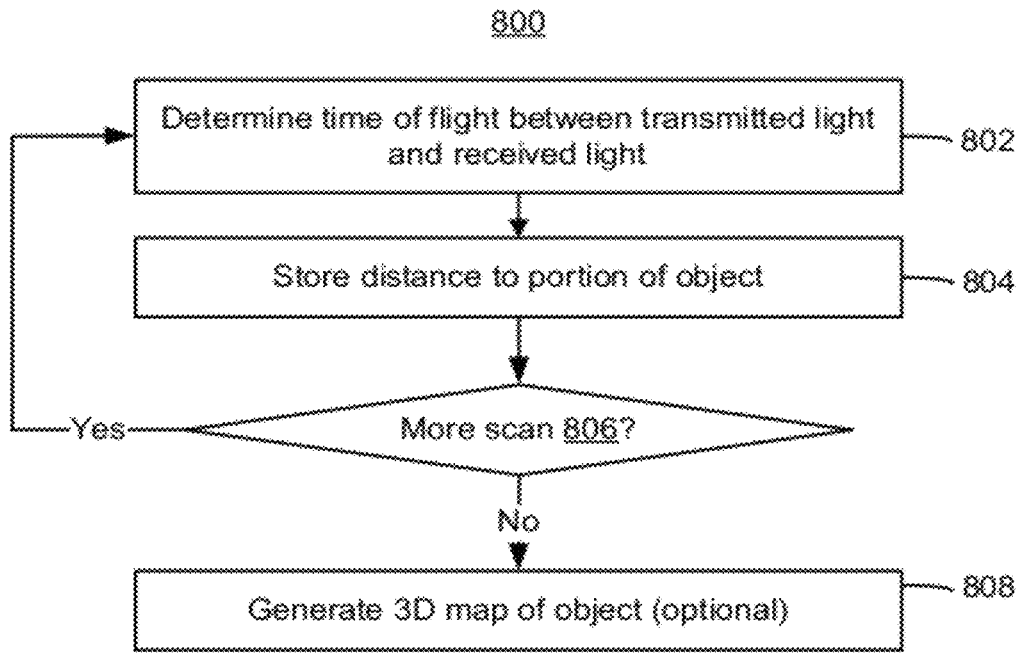
FIG. 8A is a flowchart of one embodiment of a process of determining one or more distances to an object in the camera's field of view based on time-of-flight.

FIG. 8A is a flowchart of one embodiment of a process 800 of determining one or more distances to an object 8 in the camera's field of view. Process 800 is one embodiment of step 608 of process 600. In this embodiment, the determination is made based on time-of-flight information. In some embodiments, the depth camera of FIG. 5A may use process 800. However, other depth cameras described herein are not precluded from using process 800. In step 802, a time of flight between transmitting light from the light source 524 until the light is received by the detector 504 is determined. This calculation may be performed for one portion of the raster scan. For example, the calculation may be for one pulse of light.

In one embodiment, the comparison is of the difference in phase between the transmitted light and the received image. For example, the light source may be a laser beam that is modulated at a certain frequency. The difference in phase between the modulated transmitted laser beam and the received image can be used to determine the distance to the object 8. Specifically, the distance can be determined based on the amount of phase difference and the modulation frequency.

In one embodiment, the comparison is a direct measurement of the difference in time between transmitting the light and receiving the image. For example, the light source 524 sends out a short pulse of light. When the detector 504 receives the light pulse, circuitry calculates a very precise time difference between transmission and reception. The distance can be determined based on the time difference and the light frequency.

In step 804, the distance measurement is stored in association with an indicator of what portion of the field of view was being studied. The process 800 continues to process more data by studying additional parts of the raster scan until all portions of the scan are analyzed, as determined in step 806. In optional step 808, a 3D map of the object 8 is generated based on the data stored in step 804.

Figure 8B:
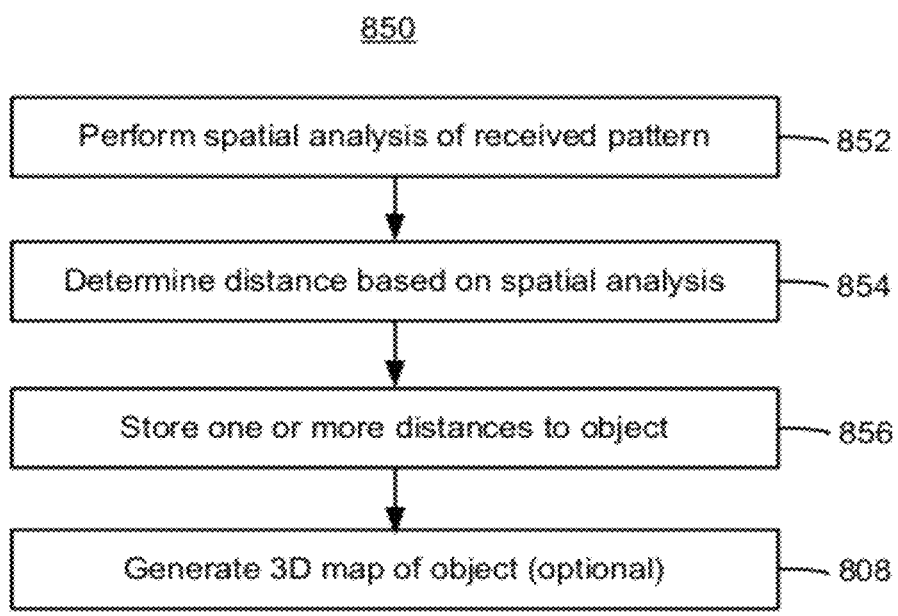
FIG. 8B is a flowchart of one embodiment of a process of determining one or more distances to an object in the camera's field of view based on spatial analysis of a received image.

FIG. 8B is a flowchart of one embodiment of a process 850 of determining one or more distances to an object 8 in the camera's field of view. In some embodiments, the depth camera of FIG. 5B may use process 800. However, other depth cameras 20 described herein are not precluded from using process 800. Process 850 is one embodiment of step 608 of process 600. In this embodiment, the determination is made based on spatial information about a received pattern. For example, the amount by which the pattern appears to deform may be used to determine distance.

In step 852, the light that was received at the linear array detector 504b is analyzed. This data may correspond to all of the scan lines or any subset of the scan lines. Note that the limited size of the object 8 means that only a portion of the pattern might be returned. However, the pattern can be constructed in a manner such that analysis of only a small portion of the pattern allows the distance to the object 8 to be determined. In one embodiment, the parallax affect is used to determine depth information. For example, the detector 504 may be off axis from the light transmitter such that the parallax affect causes an apparent deformation of the pattern from the vantage point of the detector 504. However, determining the depth information based on deformation of the pattern is not limited to the parallax affect.

In one embodiment, the depth information is determined by comparing the received image of the pattern with one or more reference images. Each reference image may correspond to a different distance from the camera. Further details of generating reference images are discussed in connection with FIG. 9. As noted the received image may appear to be deformed by an amount that corresponds to the distance from the camera. Each reference image may contain the amount and nature of deformation for a given distance. By comparing the received image to the reference images depth may be determined. Note that it is not required that the entire received image be compared with a given reference image. For example, the received image can be broken into different pieces, which are each compared to respective portions of the reference images.

In step 854, one or more distances to the object 8 are stored. Note that based on an amount of deformation to different portions of the pattern, different depth information may be determined. Therefore, step 854 may store different depth information for different part of the object 8. In optional step 808, a 3D map of the object 8 is generated based on the data stored in step 854.

Figure 9:
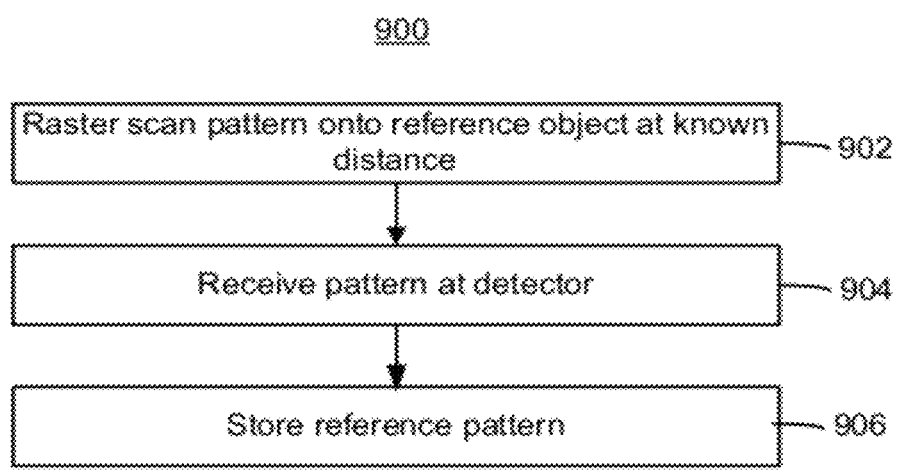
FIG. 9 is a flowchart of one embodiment of a process of generating a reference image

FIG. 9 is a flowchart of one embodiment of a process 900 of generating a reference image. The depth camera 20 that generates that reference image may have a linear array detector 504b to perform process 900; however, that is not required. The reference image may be used in step 852 of process 850. In step 902, a pattern is raster scanned onto an object 8 at a known distance from the depth camera. In one embodiment, the pattern is a structured pattern such as a grid or other known pattern.

In step 904, an image that reflects from the reference object 8 is detected at the linear array detector 504b. Note that detecting the reference image may include detecting many different scan lines. For example, if detecting a known pattern such as a grid, then data that corresponds to many different scan lines may be collected. In step 906, a reference image is stored. Process 900 may be repeated for reference objects 8 at different known distances from the depth camera. Note that it may not be necessary to empirically determine the reference images. It may be possible to mathematically determine a model for the reference images of hypothetical objects 8 at various distances from the camera. For example, when working with a known pattern such as a grid, it may be possible to mathematically determine reference images.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A depth camera, comprising:
    a point light source configured to emit a point of light;
    a raster scanning element configured to optically communicate with the point light source;
    logic configured to control the raster scanning element to raster scan the point of light from the point light source in a raster scanned pattern over a field of view of the depth camera, wherein only one point of the raster scanned pattern is projected in the field of view at any one time by the point light source;
    a light detector configured to receive reflected images of the raster scanned light from an object within the field of view, the reflected images including at least a portion of the raster scanned pattern; and
    logic configured to determine a distance from the depth camera to the object based on apparent deformation in the raster scanned pattern in the reflected images.

2. The depth camera of claim 1, wherein the deformation is a warping in the raster scanned pattern.

3. The depth camera of claim 1, wherein the pattern is a grid or stripe pattern, the logic that is configured to determine a distance is configured to determine a distance to the object by comparing spatial differences between received images of the grid or stripe pattern and a plurality of reference images, each of the reference images is an image that would result by raster scanning the grid or stripe pattern over a reference object at different known distances from the depth camera, each reference image contains an amount and a nature of deformation for the respective distance.

4. The depth camera of claim 1, wherein the light detector is off axis from the scanning element such that a parallax effect causes the apparent deformation of the raster scanned pattern from the vantage point of the light detector.

5. The depth camera of claim 1, wherein the logic is configured to scan the raster scanned pattern across the field of view such that all energy of the point of light is concentrated on a small point in the field of view.

6. The depth camera of claim 1, wherein an axis of illumination of the scanned light is aligned with an image axis of the reflected image.

7. The depth camera of claim 1, wherein the pattern is a grid or stripe pattern, the logic that is configured to determine a distance is configured to determine a distance to the object by determining spatial differences between a received image of the grid or stripe pattern and a reference image, the reference image is an image that would result by raster scanning the grid or stripe pattern over a reference object at a known distance from the camera.

8. The depth camera of claim 1, wherein the distance determination logic is configured to determine a depth image of the object in the field of view.

9. A method of scanning to determine depth information, the method comprising:
    transmitting light from a point light source in a camera;
    controlling a scanning element while transmitting the light to scan the light in a field of view of the camera, including raster scanning a raster scanned pattern in the field of view, wherein only one point of the raster scanned pattern is projected in the field of view at any one time by the point light source;
    receiving reflected images from an object in the field of view of the camera while controlling the scanning element, the reflected images include at least a portion of the raster scanned pattern;
    analyzing spatial properties of the received images, the spatial properties including warping in the raster scanned pattern; and
    determining a distance from the camera to the object based on the warping in the raster scanned pattern.

10. The method of claim 9, wherein the receiving reflected images is at a linear array detector.

11. The method of claim 9, wherein an axis of illumination of the scanned light is aligned with an image axis of the reflected image.

12. The method of claim 9, wherein the controlling a scanning element includes determining how far to raster scan a line based on whether the object has been fully scanned.

13. The depth camera of claim 9, wherein the controlling a scanning element includes rotating the scanning element to raster scan the light into the field of view.

14. The method of claim 9, wherein:
the determining a distance from the camera to the object comprises determining the distance to the object based on differences between spatial properties of the reflected images and a plurality of reference patterns, the reference patterns are each an image that would result by raster scanning the pattern over a reference object at a known distance from the camera, each reference image contains an amount and a nature of deformation for the respective known distances.

15. The method of claim 9, wherein raster scanning the raster scanned pattern in the field of view comprises:
scanning the raster scanned pattern across the field of view such that all energy of the light from the point light source is concentrated on a small point in the field of view, wherein the received reflected images from the object have a high signal/noise ratio (S/N).

16. A depth camera, comprising:
a point light source configured to emit collimated light;
a scanning element configured to optically communicate with the point light source;
logic configured to raster scan lines of the collimated light from the point light source in a raster scanned pattern over a field of view of the depth camera, wherein only one point of the raster scanned pattern is projected in the field of view at any one time by the point light source;
a light detector configured to receive reflected images of the raster scanned light from an object within the field of view, the reflected images include at least a portion of the raster scanned pattern;
logic configured to determine multiple distances from the depth camera to the object based on spatial properties of the reflected images, the logic configured to determine is configured to compare the raster scanned pattern in the reflected images with a plurality of reference images, each of the plurality of reference images is an image that would result by raster scanning the pattern over a reference object at different distances from the depth camera, each reference image contains an amount and a nature of deformation for the respective different distances; and
logic configured to generate a 3D mapping of the object based on the multiple distances.

17. The depth camera of claim 16, wherein the logic is configured to determine an amount of deformation in the raster scanned pattern to determine the multiple distances.

18. The depth camera of claim 16, wherein the raster scanned pattern is a grid pattern.

19. The depth camera of claim 16, wherein the raster scanned pattern is a stripe pattern.

* * * * *